US008447291B2

(12) United States Patent
Pica et al.

(10) Patent No.: US 8,447,291 B2
(45) Date of Patent: May 21, 2013

(54) SELECTIVE STATE TRANSITIONS OF A USER EQUIPMENT WITHIN A WIRELESS COMMUNICATIONS SYSTEM

(75) Inventors: Francesco Pica, San Diego, CA (US); Etienne Francois Chaponniere, Rome (IT); Christophe Chevallier, San Diego, CA (US); Andrea Garavaglia, Bavaria (DE); Aziz Gholmieh, Del Mar, CA (US); Long Duan, San Diego, CA (US); Mukesh Kumar Mittal, San Diego, CA (US); Mustafa Saglam, San Diego, CA (US); Sunil Suresh Patil, San Diego, CA (US); Salil Sawhney, San Diego, CA (US); Rajasekar Arulprakasam, San Diego, CA (US); Jochen Hoidis, Bavaria (DE)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 13/086,534

(22) Filed: Apr. 14, 2011

(65) Prior Publication Data

US 2012/0264416 A1    Oct. 18, 2012

(51) Int. Cl.
*H04W 24/00*   (2009.01)

(52) U.S. Cl.
USPC .................................................. 455/422.1

(58) Field of Classification Search
USPC ............... 455/445–454, 115.1, 433.2, 343.2, 455/343.5; 370/329, 330, 348, 477.23, 339, 370/389, 412, 230.1, 229, 422, 469, 419, 370/392
See application file for complete search history.

(56) References Cited

U.S. PATENT DOCUMENTS

| 5,564,015 | A  | * | 10/1996 | Bunnell | 714/47.2 |
| 6,359,557 | B2 | * | 3/2002 | Bilder | 340/531 |
| 6,799,209 | B1 | * | 9/2004 | Hayton | 709/223 |
| 7,043,752 | B2 | * | 5/2006 | Royer et al. | 726/8 |

(Continued)

FOREIGN PATENT DOCUMENTS

| EP | 1798996 A1 | 6/2007 |
| EP | 1981224 A1 | 10/2008 |

(Continued)

OTHER PUBLICATIONS

International Search Report and Written Opinion—PCT/US2012/033395—ISA/EPO—Sep. 14, 2012.

(Continued)

*Primary Examiner* — Melody Mehrpour
(74) *Attorney, Agent, or Firm* — Rupit M. Patel

(57) ABSTRACT

In an embodiment, a user equipment (UE) determines that a client application has entered a period of transmission inactivity whereby the UE will not be required to transmit data on behalf of the client application. The UE selectively transmits a transmission inactivity notification to an access network (AN) to notify the AN of the transmission inactivity period. The AN receives the transmission inactivity notification and determines to transition the UE from a first state to a second state based at least in part on the received transmission inactivity notification, the second state associated with lower-power consumption of the UE than the first state. The AN sends instructions to the UE to facilitate the transition of the UE from the first state to the second state. In another embodiment, the AN can send instructions to the UE to prohibit the UE from sending transmission inactivity notifications.

48 Claims, 11 Drawing Sheets

U.S. PATENT DOCUMENTS

| | | | |
|---|---|---|---|
| 7,046,680 B1 * | 5/2006 | McDysan et al. | 370/396 |
| 7,103,666 B2 * | 9/2006 | Royer et al. | 709/227 |
| 7,110,773 B1 * | 9/2006 | Wallace et al. | 455/456.1 |
| 7,127,608 B2 * | 10/2006 | Royer et al. | 713/162 |
| 7,127,609 B2 * | 10/2006 | Royer et al. | 713/162 |
| 7,143,437 B2 * | 11/2006 | Royer et al. | 726/8 |
| 7,249,326 B2 * | 7/2007 | Stoakley et al. | 715/779 |
| 7,301,463 B1 * | 11/2007 | Paterno | 340/573.1 |
| 7,334,031 B2 * | 2/2008 | Royer et al. | 709/224 |
| 7,353,466 B2 * | 4/2008 | Crane et al. | 715/752 |
| 7,499,458 B2 * | 3/2009 | McDysan et al. | 370/396 |
| 7,522,911 B2 * | 4/2009 | Ung et al. | 455/412.2 |
| 7,657,628 B1 * | 2/2010 | McDysan et al. | 709/225 |
| 7,680,478 B2 * | 3/2010 | Willars et al. | 455/343.2 |
| 7,809,359 B2 * | 10/2010 | Ung et al. | 455/412.2 |
| 7,849,498 B2 * | 12/2010 | Royer et al. | 726/2 |
| 7,865,839 B2 * | 1/2011 | Heikes et al. | 715/805 |

FOREIGN PATENT DOCUMENTS

| | | |
|---|---|---|
| EP | 2061192 A1 | 5/2009 |
| EP | 2384081 A2 | 11/2011 |
| WO | 2010054391 A2 | 5/2010 |

OTHER PUBLICATIONS

Vodafone, et al., "UE Fast Dormancy Behaviour", 3rd Generation Partnership Project (3GPP), Technical Specification Group (TSG) Radio Access Network (RAN), Working Group 2 (WG2), XX, XX, No. R2-074848, Nov. 5, 2007, pp. 1-9, XP002493528.

* cited by examiner

SELECTIVE STATE TRANSITIONS OF A USER EQUIPMENT WITHIN A WIRELESS COMMUNICATIONS SYSTEM

BACKGROUND

1. Field of the Invention

Embodiments of the invention relate to selective state transitions of a user equipment (UE) within a wireless communications system.

2. Relevant Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal FDMA (OFDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interacts with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

In an embodiment, a user equipment (UE) determines that a client application has entered a period of transmission inactivity whereby the UE will not be required to transmit data on behalf of the client application. The UE selectively transmits a transmission inactivity notification to an access network (AN) to notify the AN of the transmission inactivity period. The AN receives the transmission inactivity notification and determines to transition the UE from a first state to a second state based at least in part on the received transmission inactivity notification, the second state associated with lower-power consumption of the UE than the first state. The AN sends instructions to the UE to facilitate the transition of the UE from the first state to the second state. In another embodiment, the AN can send instructions to the UE to prohibit the UE from sending transmission inactivity notifications.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
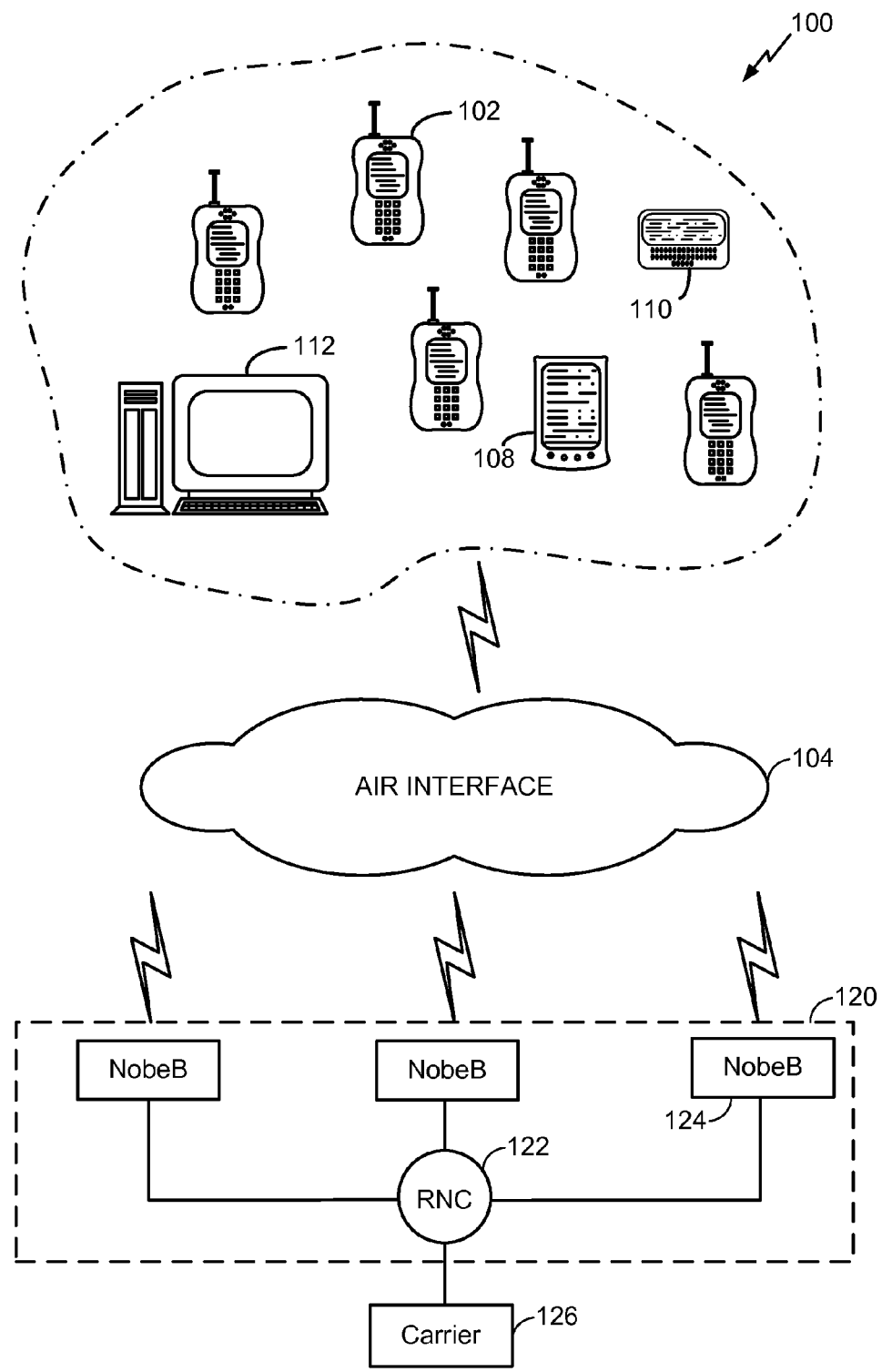
FIG. 1 is a diagram of a wireless network architecture that supports user equipments and radio access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple UEs.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
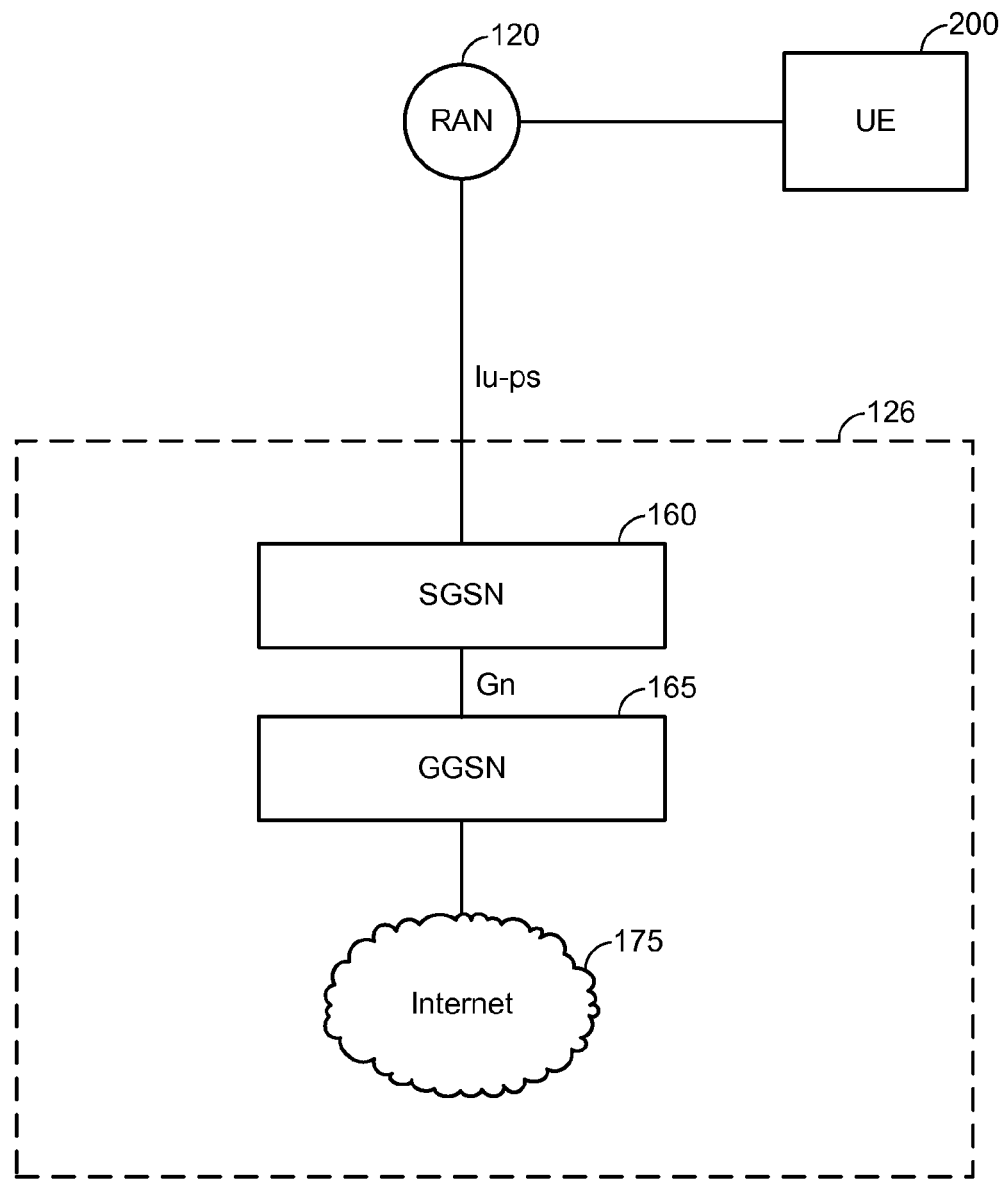
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SSGN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
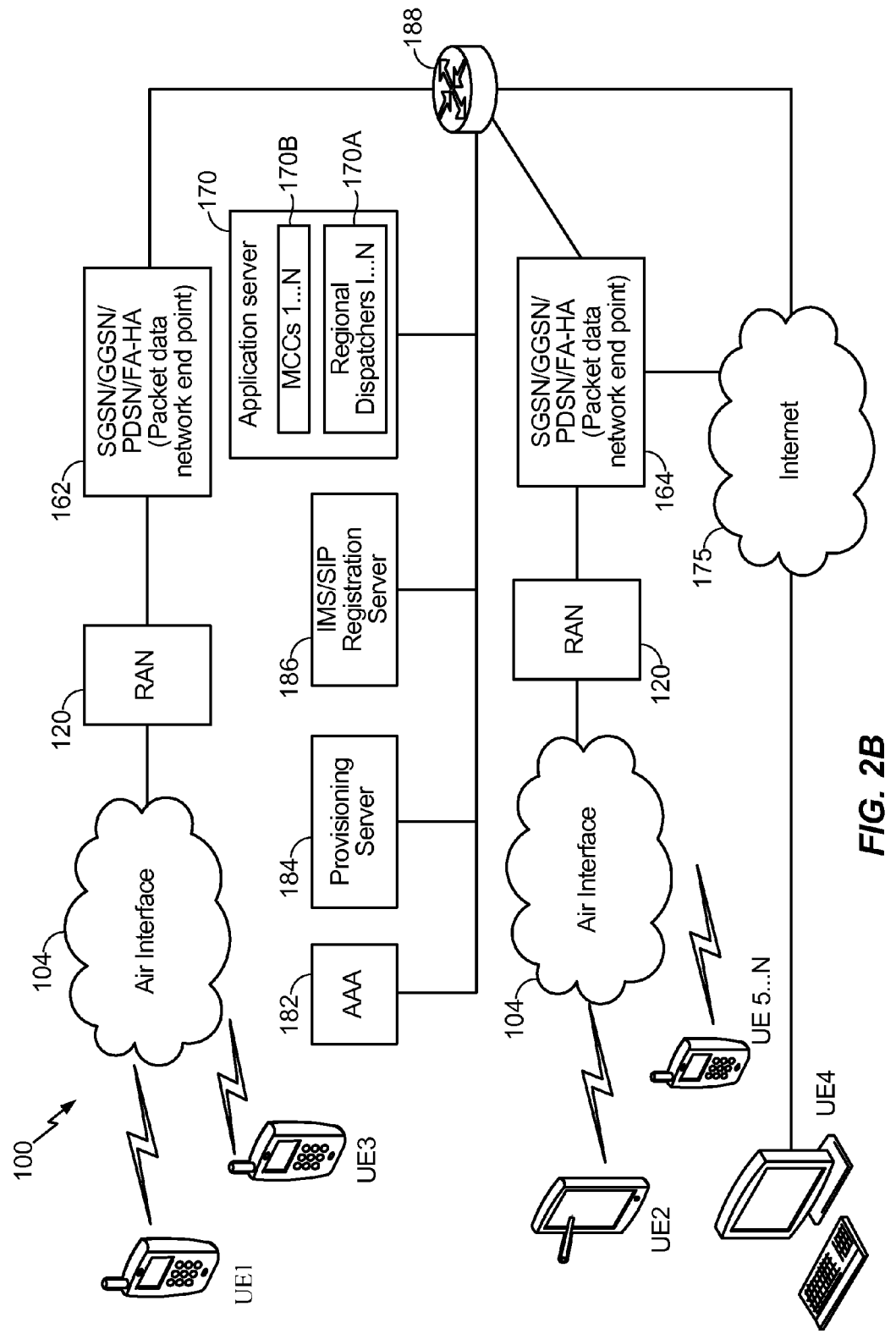
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
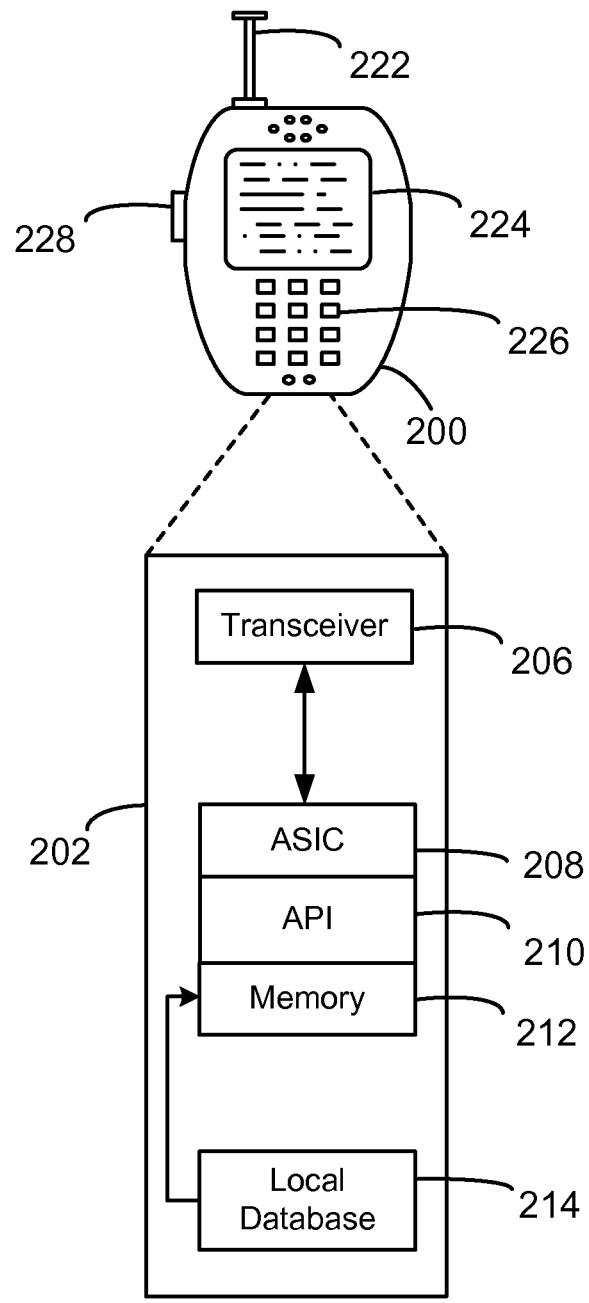
FIG. 3 is an illustration of user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

In a conventional server-arbitrated communication session (e.g., via half-duplex protocols, full-duplex protocols, VoIP, a group session over IP unicast, a group session over IP multicast, a push-to-talk (PTT) session, a push-to-transfer (PTX) session, etc.), a session or call originator sends a request to initiate a communication session to the application server 170, which then forwards a call announcement message to the RAN 120 for transmission to one or more targets of the call.

User Equipments (UEs), in a Universal Mobile Telecommunications Service (UMTS) Terrestrial Radio Access Network (UTRAN) (e.g., the RAN 120) may be in either an idle mode or a radio resource control (RRC) connected mode.

Based on UE mobility and activity while in a RRC connected mode, the RAN 120 may direct UEs to transition between a number of RRC sub-states; namely, CELL_PCH, URA_PCH, CELL_FACH, and CELL_DCH states, which may be characterized as follows:

In the CELL_DCH state, a dedicated physical channel is allocated to the UE in uplink and downlink, the UE is known on a cell level according to its current active set, and the UE has been assigned dedicated transport channels, downlink and uplink (TDD) shared transport channels, and a combination of these transport channels can be used by the UE.

In the CELL_FACH state, no dedicated physical channel is allocated to the UE, the UE continuously monitors a forward access channel (FACH), the UE is assigned a default common or shared transport channel in the uplink (e.g., a random access channel (RACH), which is a contention-based channel with a power ramp-up procedure to acquire the channel and to adjust transmit power) that the UE can transmit upon according to the access procedure for that transport channel, the position of the UE is known by RAN 120 on a cell level according to the cell where the UE last made a previous cell update, and, in TDD mode, one or several USCH or DSCH transport channels may have been established.

In the CELL_PCH state, no dedicated physical channel is allocated to the UE, the UE selects a PCH with the algorithm, and uses DRX for monitoring the selected PCH via an associated PICH, no uplink activity is possible and the position of the UE is known by the RAN 120 on cell level according to the cell where the UE last made a cell update in CELL_FACH state.

In the URA_PCH state, no dedicated channel is allocated to the UE, the UE selects a PCH with the algorithm, and uses DRX for monitoring the selected PCH via an associated PICH, no uplink activity is possible, and the location of the UE is known to the RAN 120 at a Registration area level according to the UTRAN registration area (URA) assigned to the UE during the last URA update in CELL_FACH state.

Accordingly, URA_PCH State (or CELL_PCH State) corresponds to a dormant state where the UE periodically wakes up to check a paging indicator channel (PICH) and, if needed, the associated downlink paging channel (PCH), and it may enter CELL_FACH state to send a Cell Update message for the following event: cell reselection, periodical cell update, uplink data transmission, paging response, re-entered service area. In CELL_FACH State, the UE may send messages on the random access channel (RACH), and may monitor a forward access channel (FACH). The FACH carries downlink communication from the RAN 120, and is mapped to a secondary common control physical channel (S-CCPCH). From CELL_FACH State, the UE may enter CELL_DCH state after a traffic channel (TCH) has been obtained based on messaging in CELL_FACH state. A table showing conventional dedicated traffic channel (DTCH) to transport channel mappings in radio resource control (RRC) connected mode, is in Table 1 as follows:

TABLE 1

DTCH to Transport Channel mappings in RRC connected mode

|  | RACH | FACH | DCH | E-DCH | HS-DSCH |
|---|---|---|---|---|---|
| CELL_DCH | No | No | Yes | Yes | Yes |
| CELL_FACH | Yes | Yes | No | Yes (rel. 8) | Yes (rel. 7) |
| CELL_PCH | No | No | No | No | Yes (rel. 7) |
| URA_PCH | No | No | No | No | No | wherein the notations (rel. 8) and (rel. 7) indicate the associated 3GPP release where the indicated channel was introduced for monitoring or access.

Communication sessions arbitrated by the application server 170, in at least one embodiment, may be associated with delay-sensitive or high-priority applications and/or services. For example, the application server 170 may correspond to a PTT server in at least one embodiment, and it will be appreciated that an important criterion in PTT sessions is fast session set-up as well as maintaining a given level of Quality of Service (QoS) throughout the session.

As discussed above, in RRC connected mode, a given UE can operate in either CELL_DCH or CELL_FACH to exchange data with the RAN 120, through which the given UE can reach the application server 170. As noted above, in CELL_DCH state, uplink/downlink Radio bearers will consume dedicated physical channel resources (e.g., UL DCH, DL DCH, E-DCH, F-DPCH, HS-DPCCH etc). Some of these resources are even consumed for high speed shared channel (i.e., HSDPA) operations. In CELL_FACH state, uplink/downlink Radio bearers will be mapped to common transport channels (RACH/FACH). Thereby, in CELL_FACH state there is no consumption of dedicated physical channel resources.

Conventionally, the RAN 120 transitions the given UE between CELL_FACH and CELL_DCH based substantially on traffic volume, which is either measured at the RAN 120 (e.g., at the serving RNC 122 at the RAN 120) or reported from the given UE itself in one or more measurement reports. Specifically, the RAN 120 can conventionally be configured to transition a particular UE to CELL_DCH state from CELL_FACH state when the UE's associated traffic volume as measured and/or reported in the uplink or as measured and/or reported in the downlink is higher than the one or more of the Event 4a thresholds used by the RAN 120 for making CELL_DCH state transition decisions.

As noted above, the UE's state (e.g., CELL_DCH, CELL_FACH, CELL_PCH or URA_PCH) can be determined based in part on the amount of uplink data to be sent by the originating UE. For example, the standard defines an Event 4a threshold for triggering a Traffic Volume Measurement (TVM) report. The Event 4a threshold is specified in the standard, and is used by the UE for triggering Traffic Volume Measurement Report, which summarizes the buffer occupancy of each uplink Radio Bearer.

Other parameters which are not defined in the standard are an uplink Event 4a threshold for triggering the state transition of a given UE to CELL_DCH state, and a downlink Event 4a threshold for triggering the state transition of the given UE to CELL_DCH state. As will be appreciated, the uplink and downlink Event 4a thresholds being 'undefined' in the standard means that the respective thresholds can vary from vendor to vendor, or from implementation to implementation at different RANs.

Referring to the uplink Event 4a threshold, in CELL_FACH state, if the reported uplink buffer occupancy of each Radio Bearer exceeds the uplink Event 4a threshold, the RNC 122 moves the UE to CELL_DCH. In an example, this decision may be made based on the aggregated buffer occupancy or individual Radio Bearer buffer occupancy. If aggregated buffer occupancy is used for deciding the CELL_DCH transition, the same threshold for triggering TVM can be used. Similarly, referring to the downlink Event 4a threshold, in CELL_FACH state, if the downlink buffer occupancy of the Radio Bearers of the UE exceeds the downlink Event 4a threshold, the RNC 122 moves the UE to CELL_DCH state. In an example, this decision may be done based on the aggregated buffer occupancy or individual Radio Bearer buffer occupancy.

As will be appreciated, UEs generally consume more power during operation in CELL_DCH state as compared to CELL_FACH state, and UEs also generally consume more power during operation in CELL_FACH state as compared to CELL_PCH and/or URA_PCH states. Thus, aside from consuming more system resources, maintaining UEs in more active RRC-states decreases their associated battery life.

Conventionally, the RAN 120 (i.e., the serving RNC for a particular UE) does not evaluate application-specific information for determining RRC-state transitions. Instead, the serving RNC simply evaluates the UL or DL traffic volume as noted above, or alternatively maintains a traffic inactivity timer associated with the UE's RRC-connection. Embodiments of the invention are directed to using application-specific information in order to improve the RRC-state transition decisions at the RAN 120 so as to increase battery life associated with UEs. For example, UEs in CELL_DCH state to support a communication session for a Web-browsing client application may benefit from a relatively long traffic inactivity timer before the RAN 120 triggers a RRC-state transition of the UEs to CELL_FACH state, CELL_PCH state and/or URA_PCH state. On the other hand, UEs in CELL_DCH state that are executing a client application associated with bursty-traffic (e.g., periodically pulling E-mails from an E-mail server, sending periodic keep-alive packets, etc.) can operate with a shorter traffic inactivity timer so as to conserve battery life at the UEs.

Figure 4A:
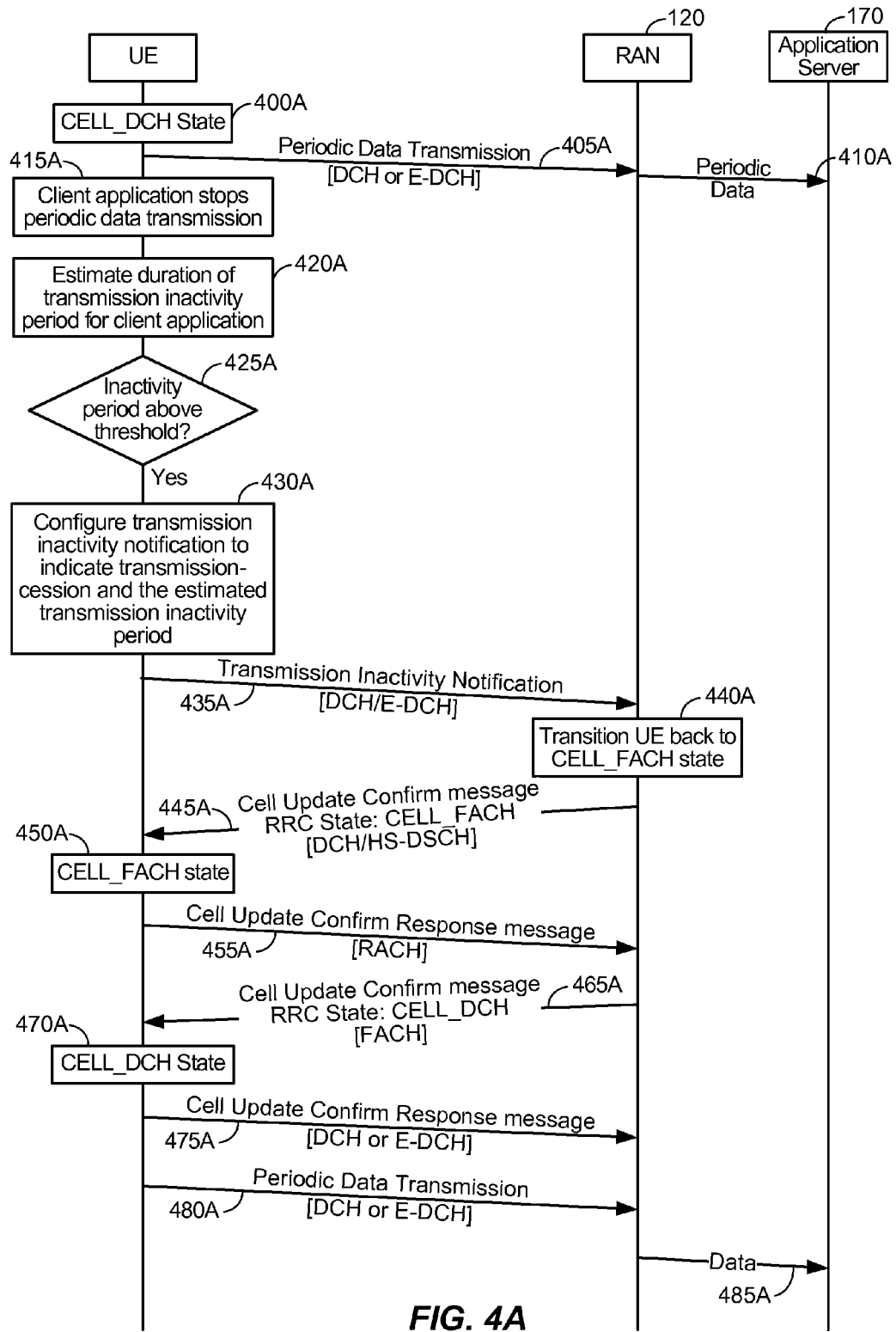
FIG. 4A illustrates a process of selectively transitioning a state of a given UE based on an estimated traffic inactivity period associated with a given client application in accordance with an embodiment of the invention.

FIG. 4A illustrates a process of selectively transitioning a RRC-state of a given UE based on an estimated traffic inactivity period associated with a given client application in accordance with an embodiment of the invention. Referring to FIG. 4A, assume that the given UE is operating in CELL_DCH state, 400A. While in CELL_DCH state, the given client application being executed on the given UE is engaged in a communication session with the application server 170 whereby the given UE transmits periodic data at a given periodic interval on a reverse-link DCH or E-DCH to the RAN 120, 405A, and the RAN 120 forwards the periodic data to the application server 170, 410A. For example, the periodic data transmission of 405A and 410A can correspond to a periodic request to retrieve E-mails from the application server 170, a periodic keep-alive packet to maintain a session with the application server 170, etc. While not shown in FIG. 4A, the periodic data transmission of 405A and 410A may prompt the application server 170 to respond with mobile-terminated data for the given UE (e.g., the requested E-mails, one or more ACKs, etc.).

Referring to FIG. 4A, the given client application determines to stop transmitting the periodic data in 415A. In other words, one particular instance of the periodic data transmission completes or terminates, and the given client application does not have additional data to send at this point (at least, until a next periodic data transmission). The given client application may subsequently notify the RRC protocol in the given UE about the periodic data transmission termination plus the next point in the time, if known or configured, that the given client application is expected to have data to transmit to the application server 170 (i.e., an estimated duration of the transmission inactivity period), 420A.

The given UE compares the estimated duration of the transmission inactivity period, as indicated by the given client application, with a transmission inactivity period threshold to determine whether to report the estimated transmission inactivity period to the given UE's serving RNC at the RAN 120, 425A. For example, it will be appreciated that transitions from CELL_DCH state to another RRC-state (e.g., CELL_FACH state, CELL_PCH state, URA_PCH state, etc.) take a certain amount of time to complete (e.g., 100 ms), such that it is inefficient to transition the given UE to another RRC-state if the given UE is expected to be transmitting data again before the transmission inactivity period threshold. As will be described below with respect to FIG. 4D, the transmission inactivity period threshold can be established at the given UE based on instructions from the serving RNC at the RAN 120. Alternatively, the transmission inactivity period threshold can be independently provisioned at the given UE.

While not shown explicitly in FIG. 4A, if the given UE determines that the estimated duration of the transmission inactivity period is not above the transmission inactivity period threshold, the given UE remains in CELL_DCH state and no transmission inactivity notification is sent to the serving RNC at the RAN 120. However, if the given client application determines that the estimated duration of the transmission inactivity period is above the transmission inactivity period threshold, the given client application configures a transmission inactivity notification to indicate the cessation of its data transmission and also to indicate the estimated duration of the transmission inactivity period from 420A, 430A. In an embodiment, the transmission inactivity notification in 430A corresponds to an RRC-layer message, such as a Signaling Connection Release Indication message. The given UE transmits the transmission inactivity notification over the reverse-link DCH or E-DCH to the serving RNC at the RAN 120, 435A.

Alternatively, as will be discussed below in more detail with respect to FIG. 4D, if the estimated duration of the transmission inactivity period is not provided by the client application to the RRC protocol of the given UE, the given UE may send the transmission inactivity notification to indicate the cessation of its data transmission without a separate indication of the estimated duration of the transmission inactivity period.

The serving RNC for the given UE receives the transmission inactivity notification and determines to transition the given UE to CELL_FACH state in 440A. As will be appreciated, while not shown in FIG. 4A, the serving RNC can compare the estimated duration of the transmission inactivity timer with its own threshold(s) to determine whether to transition the RRC-state of the given UE, as well as the target RRC-state for the transition. For example, if the estimated duration of the transmission inactivity period is very long, the serving RNC may determine to transition the given UE to CELL_PCH state or URA_PCH state or Idle state, instead of CELL_FACH state, to further conserve power. In another example, if the estimated duration of the transmission inactivity period is intermediate, the serving RNC may determine to transition the given UE to CELL_FACH state as shown in FIG. 4A. In another example, if the estimated duration of the transmission inactivity period is very low, the serving RNC can determine to permit the given UE to remain in CELL_DCH state (e.g., although the threshold-comparison in 425A at the given UE may make this condition unlikely to occur). As will be appreciated, the estimated duration of the transmission inactivity period need not be the only factor affecting the serving RNC's decision with regard to the RRC state-transition of the given UE. For example, other factors such as current resource utilization, QoS targets (e.g., latency) of the given UE and/or other factors can be evaluated in conjunction with the estimated duration of the transmission inactivity period during the RRC state-transition determination at the serving RNC at 440A.

If the serving RNC at the RAN 120 determines to transition the RRC-state of the given UE, the serving RNC sends a reconfiguration message (or Cell Update Confirm (CUC) message) to the given UE on the forward-link DCH or HS-DSCH instructing the given UE to transmission from CELL_DCH state to CELL_FACH state, 445A. Accordingly, the given UE transitions to CELL_FACH state, 450A, and ACKs the RRC-state transition by sending a reconfiguration complete message (or CUC complete message), 455A. At some later point in time, assume that the given UE reaches the next periodic data transmission, such that the serving RNC transitions the given UE back to CELL_DCH in expectation of the next periodic data transmission by sending another reconfiguration or CUC message to the given UE (e.g., in response to some type of event or report from the given UE, not shown explicitly in FIG. 4A), 465A. Accordingly, the given UE transitions back to CELL_DCH state, 470A, sends a reconfiguration complete or CUC response message, 475A, and then sends the next periodic data transmission, 480A, which is forwarded by the RAN 120 to the application server 170, 485A. As will be appreciated by one of ordinary skill in the art, the transition of the given UE to CELL_FACH state in FIG. 4A between the periodic data transmissions conserves battery life at the given UE.

Figure 4B:
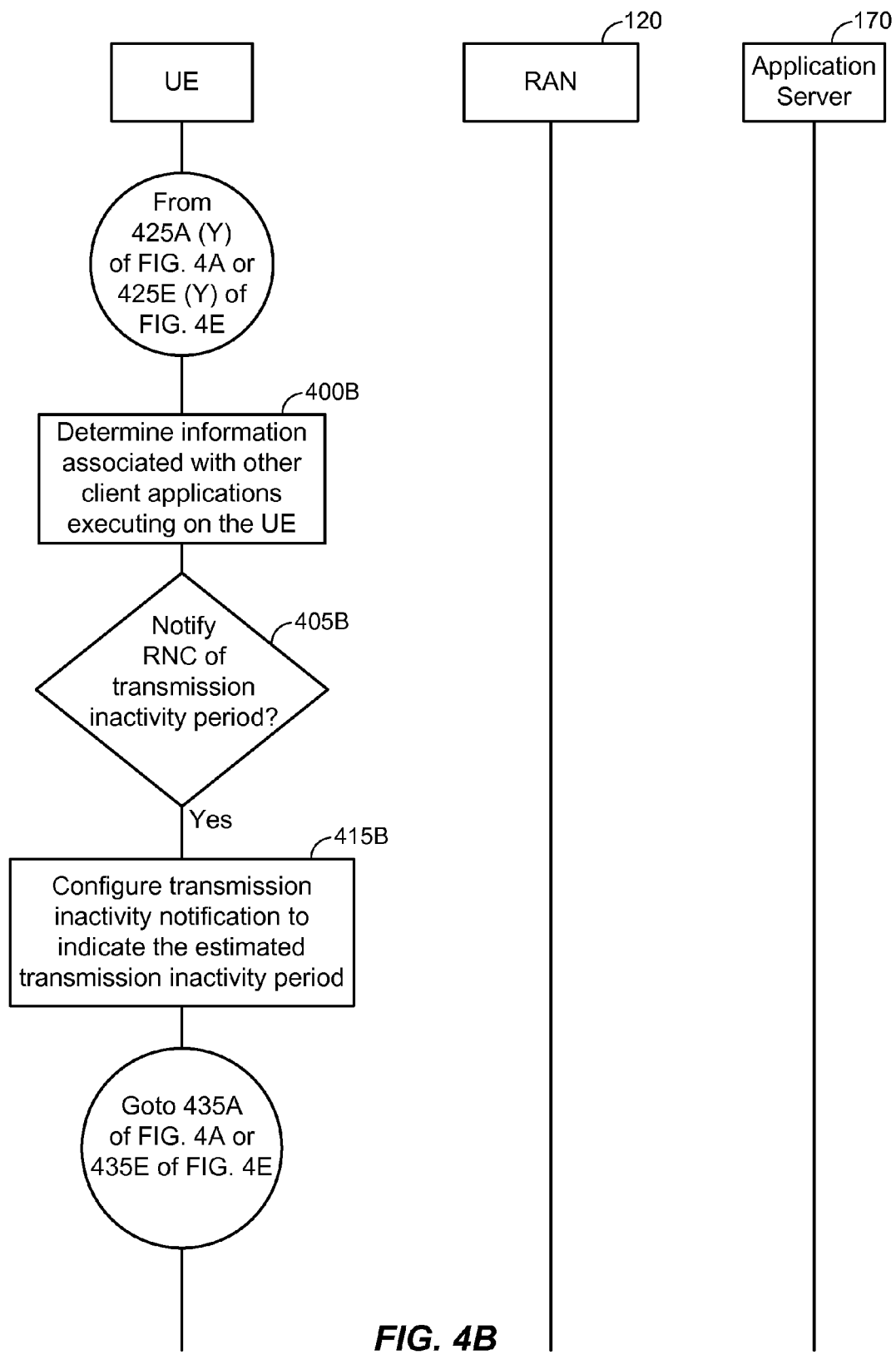
FIG. 4B illustrates an alternative implementation of the process of FIG. 4A in accordance with an embodiment of the invention.

FIG. 4B illustrates an alternative implementation of the process of FIG. 4A in accordance with an embodiment of the invention. Referring to FIG. 4B, assume that the process of FIG. 4A (or FIG. 4E) executes, that decision block 425A (or 425E) determines that the estimated duration of the transmission inactivity period is above the transmission inactivity period threshold, after which the process advances to 400B of FIG. 4B.

Referring to FIG. 4B, the given UE determines information associated with one or more client applications, other than the given client application, being executed on the given UE, 400B. For example, the given UE may determine, in 400B, that the given client application (e.g., E-mail) is the only client application currently being executed by the given UE. In another example, the given UE may determine, in 400B, that the given client application is one of many client applications being executed on the given UE. As will be appreciated, the determination of how many client applications are executing on the given UE can be used to infer whether the given UE's transmission buffer is empty or not (i.e., whether the given UE has data to transmit). Based on the determined information in 400B, the given UE determines whether to report the transmission inactivity period to the serving RNC, 405B. While not shown explicitly in FIG. 4B, if the given client application determines not to report the transmission inactivity period to the serving RNC, no transmission inactivity notification is transmitted by the given UE at this point.

Otherwise, if the given UE determines to report the transmission inactivity period to the serving RNC, in 415B, the given UE configures a transmission inactivity notification to indicate (i) the cessation of its data transmission and (ii) the estimated duration of the transmission inactivity period from 420A In an embodiment, the transmission inactivity notification in 415B corresponds to a RRC-layer message, such as a Signaling Connection Release Indication message. The process then advances to 435A of FIG. 4A (or 435E of FIG. 4E), whereby the given UE transmits the transmission inactivity notification over the reverse-link DCH or E-DCH to the serving RNC at the RAN 120.

Figure 4C:
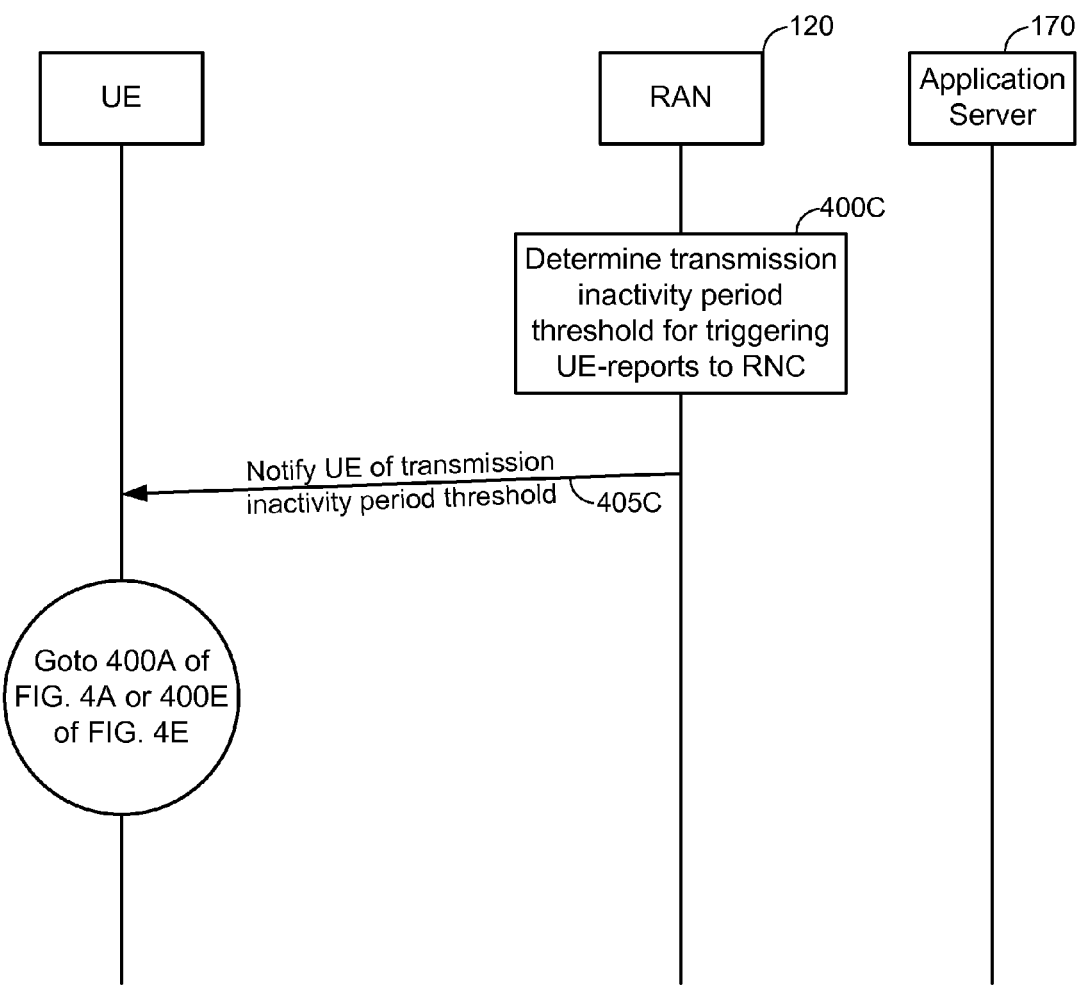
FIG. 4C illustrates a process that can occur before the processes of FIGS. 4A and/or FIG. 4E in accordance with an embodiment of the invention.

As discussed above with respect to FIG. 4A, the transmission inactivity period threshold that is used in the decision block 425A can be provisioned to the given UE by the serving RNC. Accordingly, with respect to FIG. 4C, at some point in time prior to the execution of the process of FIG. 4A, the serving RNC at the RAN 120 determines a transmission inactivity period threshold for triggering UE-reports of transmission inactivity to the serving RNC, 400C. In an example, the threshold determined in 400C can be specific to one particular UE or to one particular group of UEs. In another example, the threshold determined in 400C can be 'global', at least within a serving area (e.g., a subnet) of the serving RNC. After determining the transmission inactivity period threshold in 400C, the RAN 120 notifies the given UE of the transmission inactivity period threshold in 405C. In an example, the notification of 405C can be a unicast message that is sent individually to the given UE (e.g., during RRC connection set-up, at some point while the given UE is in a RRC-connected state, etc.). Alternatively, the notification of 405C can be sent to multiple UEs concurrently, such as via a broadcasted or multicasted message. After the notification of 405C, the process can advance to a process such as FIG. 4A (or FIG. 4E), whereby the transmission inactivity period threshold is used by the given to determine whether to report transmission inactivity periods to the serving RNC.

Figure 4D:
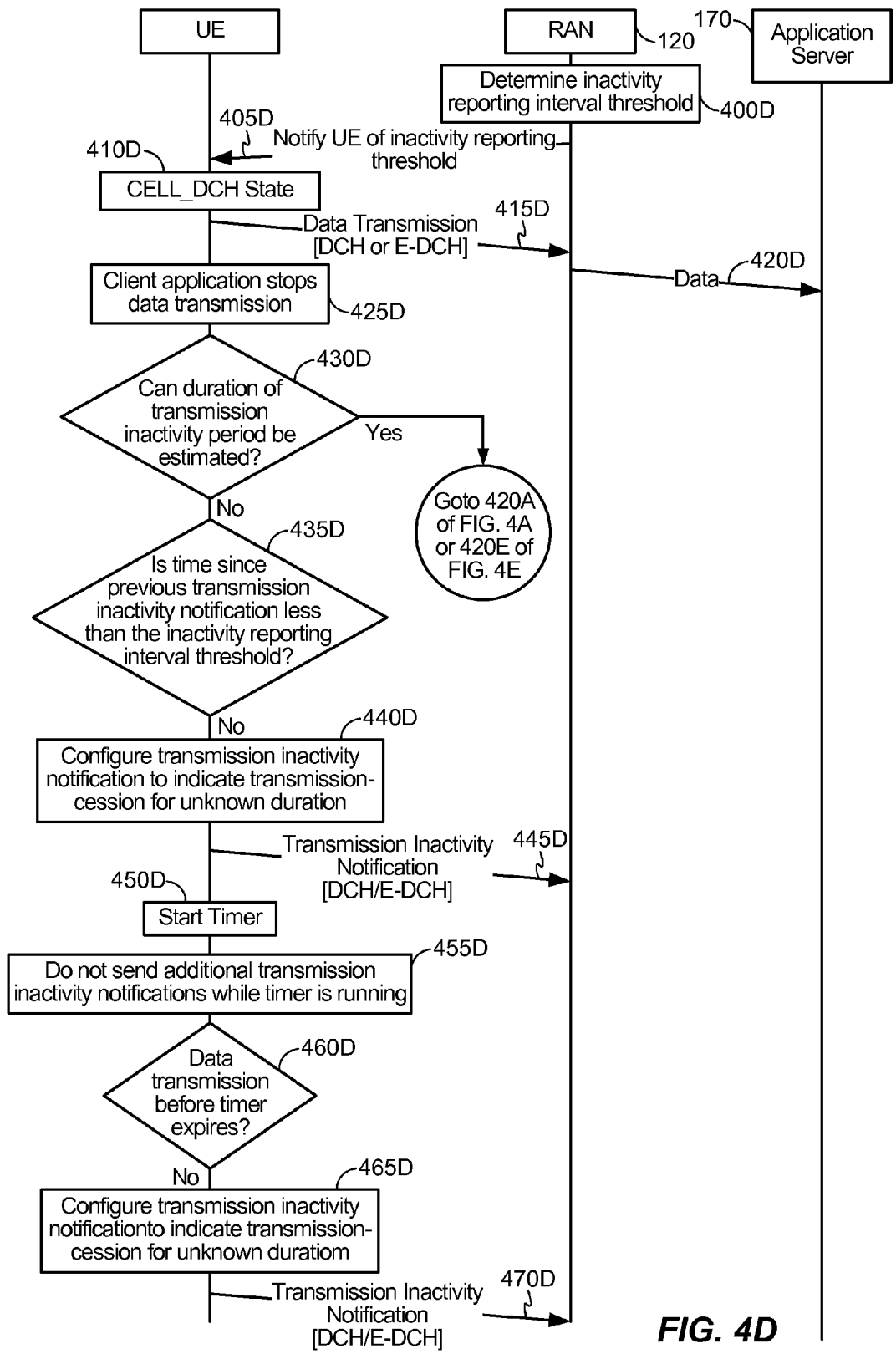
FIG. 4D illustrates a process of reporting periods of transmission inactivity when a duration of the transmission inactivity period cannot be estimated in accordance with an embodiment of the invention.

FIG. 4D illustrates a process of reporting periods of transmission inactivity when a duration of the transmission inactivity period cannot be estimated in accordance with an embodiment of the invention. Referring to FIG. 4D, at some point in time prior to the execution of the process of FIG. 4A, the serving RNC at the RAN 120 determines an inactivity reporting interval threshold, 400D. The inactivity reporting interval threshold determined at 400D corresponds to a minimum interval at which the given UE is permitted to send transmission inactivity notifications to the serving RNC when the given UE cannot estimate when a next transmission associated with the given client application will occur. Thus, when the given client application stops transmitting, but is unaware of when a next data transmission will occur, the given client application can send transmission inactivity notifications to the serving RNC so long as the notifications are spread apart, in time, by at least the inactivity reporting interval threshold.

After determining the inactivity reporting interval threshold in 400D, the RAN 120 notifies the given UE of the inactivity reporting interval threshold in 405D. In an example, the notification of 405D can be a unicast message that is sent individually to the given UE (e.g., during RRC connection set-up, at some point while the given UE is in a RRC-connected state, etc.). Alternatively, the notification of 405D can be sent to multiple UEs concurrently, such as via a multicasted or broadcasted message.

At some point after the notification of 405D, assume that the given UE enters CELL_DCH state, 410D, and transmits data to the RAN 120, 415D, which then forwards the data transmission to the application server 170, 420D. Next, assume that the data transmission of 415D completes at the given UE and the given client application has no additional data to send, 425D. Next, the given UE determines whether the duration of the transmission inactivity period (i.e., from which the time that a next transmission of data by the given client application will occur can be inferred) can be estimated, 430D. In FIG. 4A, it is assumed that the duration of the transmission inactivity period can be estimated because the data being transmitted is periodic. Accordingly, if the duration of the transmission inactivity period can be estimated in 430D, the process advances to 420A of FIG. 4A (or 420E of FIG. 4E).

Alternatively, if the duration of the transmission inactivity period cannot be estimated in 430D, the given UE determines whether the time that has elapsed since a previous transmission inactivity notification is greater than the inactivity reporting interval threshold, 435D. In 435D, assume that the given UE determines that the time that has elapsed since a previous transmission inactivity notification is greater than the inactivity reporting interval threshold. Accordingly, the given UE configures a transmission inactivity notification to indicate the cessation of its data transmission, 440D. Unlike the transmission inactivity notification of 430A of FIG. 4A, the transmission inactivity notification of 440D does not indicate the estimated duration of the transmission inactivity period because the duration of the transmission inactivity period cannot be estimated by the given UE at this point. The given UE transmits the transmission inactivity notification to the serving RNC at the RAN 120 in 445D. While not shown in FIG. 4D explicitly, this may cause the serving RNC to transition the given UE to another RRC-state, or alternatively the serving RNC may permit the given UE to remain in RRC-state until one or more additional transmission inactivity notification are reported to the serving RNC.

Turning back to the given UE, in 450D, the given UE starts a timer after the transmission of the transmission inactivity notification in 445D. The timer has an expiration based on the inactivity reporting interval threshold, in an example. So long as the timer is running, the given UE does not send another transmission inactivity notification, 455D. In 460D, the given UE determines whether the given client application of the given UE transmitted data to the RAN 120 before expiration of the timer. In this embodiment, assume no data was transmitted during the running of the timer, such that the given UE configures and transmits another transmission inactivity notification to the serving RNC at the RAN 120 in 465D and 470D, respectively (as in 440D and 445D).

Figure 4E:
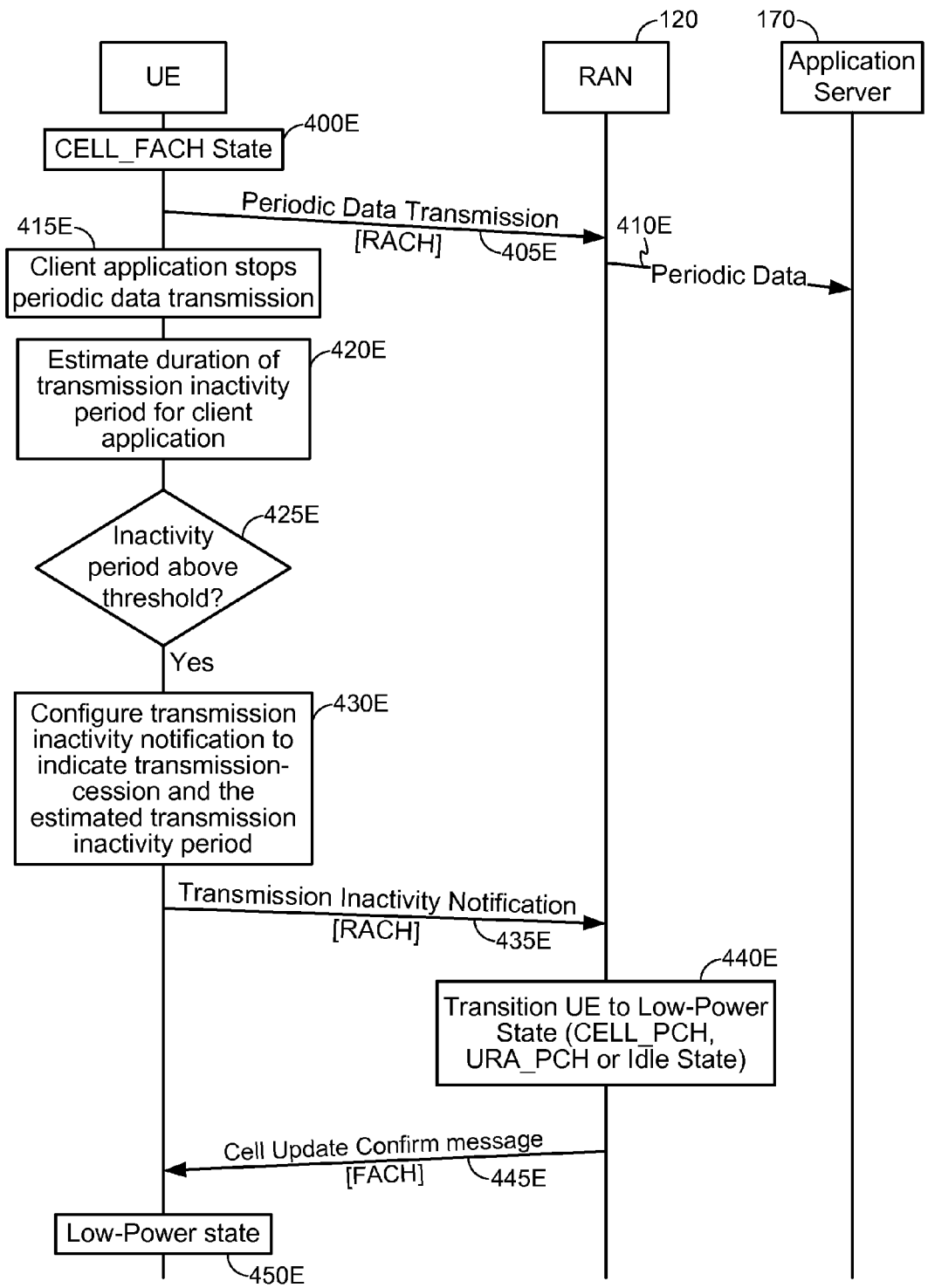
FIG. 4E illustrates another process of selectively transitioning a state of a given UE based on an estimated traffic inactivity period associated with a given client application in accordance with another embodiment of the invention.

FIG. 4E illustrates another process of selectively transitioning a RRC-state of a given UE based on an estimated traffic inactivity period associated with a given client application in accordance with another embodiment of the invention. For the most part, FIG. 4E is similar to portions of FIG. 4A. However, in the embodiment of FIG. 4E, the given UE is configured to transmit while in CELL_FACH state (i.e., on the RACH) instead of in CELL_DCH (e.g., on the DCH or E-DCH).

Accordingly, referring to FIG. 4E, assume that the given UE is operating in CELL_FACH state, 400E. While in CELL_FACH state, the given client application being executed on the given UE is engaged in a communication session with the application server 170 whereby the given UE transmits periodic data at a given periodic interval on the RACH to the RAN 120, 405E, and the RAN 120 forwards the periodic data to the application server 170, 410E. For example, the periodic data transmission of 405E and 410E can correspond to a periodic request to retrieve E-mails from the application server 170, a periodic keep-alive packet to maintain a session with the application server 170, etc. While not shown in FIG. 4E, the periodic data transmission of 405E and 410E may prompt the application server 170 to respond with mobile-terminated data for the given UE (e.g., the requested E-mails, one or more ACKs, etc.).

Referring to FIG. 4E, the given client application determines to stop transmitting the periodic data in 415E. In other words, one particular instance of the periodic data transmission completes or terminates, and the given client application does not have additional data to send at this point (at least, until a next periodic data transmission). The given client application may subsequently notify the RRC protocol in the UE about the periodic data transmission termination plus the next point in the time, if known or configured, that the given client application is expected to have data to transmit to the application server 170 (i.e., an estimated duration of the transmission inactivity period), 420E.

The given UE compares the transmission inactivity period, as indicated by the given client application, with a transmission inactivity period threshold to determine whether to report the estimated transmission inactivity period to the given UE's serving RNC at the RAN 120, 425E. For example, it will be appreciated that transitions from CELL_FACH state to a lower-powered RRC-state (e.g., CELL_PCH state, URA_PCH state, etc.) or idle state take a certain amount of time to complete (e.g., 100 ms), such that it is inefficient to transition the given UE to a lower-powered state if the given UE is expected to be transmitting data again before the transmission inactivity period threshold. As described above with respect to FIG. 4D, the transmission inactivity period threshold can be established at the given UE based on instructions from the serving RNC at the RAN 120. Alternatively, the transmission inactivity period threshold can be independently provisioned at the given UE.

While not shown explicitly in FIG. 4E, if the given UE determines that the estimated duration of the transmission inactivity period is not above the transmission inactivity period threshold, the given UE remains in CELL_FACH state and no transmission inactivity notification is sent to the serving RNC at the RAN 120. However, if the given client application determines that the estimated duration of the transmission inactivity period is above the transmission inactivity period threshold, the given client application configures a transmission inactivity notification to indicate the cessation of its data transmission and also to indicate the estimated duration of the transmission inactivity period from 420E, 430E. In an embodiment, the transmission inactivity notification in 430E corresponds to a RRC-layer message, such as a Signaling Connection Release Indication message. The given UE transmits the transmission inactivity notification over the RACH to the serving RNC at the RAN 120, 435E.

Alternatively, as discussed above with respect to FIG. 4D, if the estimated duration of the transmission inactivity period is not provided by the client application to the RRC protocol of the given UE, the given UE may send the transmission inactivity notification to indicate the cessation of its data transmission without a separate indication of the estimated duration of the transmission inactivity period.

The serving RNC for the given UE receives the transmission inactivity notification and determines to transition the given UE to a lower-powered state in 440E. As will be appreciated, while not shown in FIG. 4E, the serving RNC can compare the estimated duration of the transmission inactivity timer with its own threshold(s) to determine whether to transition the RRC-state of the given UE, as well as the target RRC-state for the transition. For example, if the estimated duration of the transmission inactivity period is relatively short, the serving RNC may determine to transition the given UE to CELL_PCH state or URA_PCH state. In another example, if the estimated duration of the transmission inactivity period is relatively long, the serving RNC may determine to transition the given UE to Idle state. In another example, if the estimated duration of the transmission inactivity period is very low, the serving RNC can determine to permit the given UE to remain in CELL_FACH state (e.g., although the threshold-comparison in 425E at the given UE may make this condition unlikely to occur). As will be appreciated, the estimated duration of the transmission inactivity period need not be the only factor affecting the serving RNC's decision with regard to the RRC state-transition of the given UE. For example, other factors such as current resource utilization, QoS targets (e.g., latency) of the given UE and/or other factors can be evaluated in conjunction with the estimated duration of the transmission inactivity period during the RRC state-transition determination at the serving RNC at 440E.

If the RNC determines to transition the RRC-state of the given UE, the serving RNC sends a reconfiguration message (or Cell Update Confirm (CUC) message) to the given UE on the FACH instructing the given UE to transmission from CELL_FACH state to the lower-powered state, 445E. Accordingly, the given UE transitions to the lower-powered state, 450E.

While not shown explicitly in FIG. 4E, at some later point in time, the given UE may determine to transmit the next periodic data transmission. At this point, the given UE can transition back to CELL_FACH state in order to complete the transmission, and so on. As will be appreciated by one of ordinary skill in the art, the transition of the given UE to the lower-powered state in FIG. 4E between the periodic data transmissions conserves battery life at the given UE.

Figure 5A:
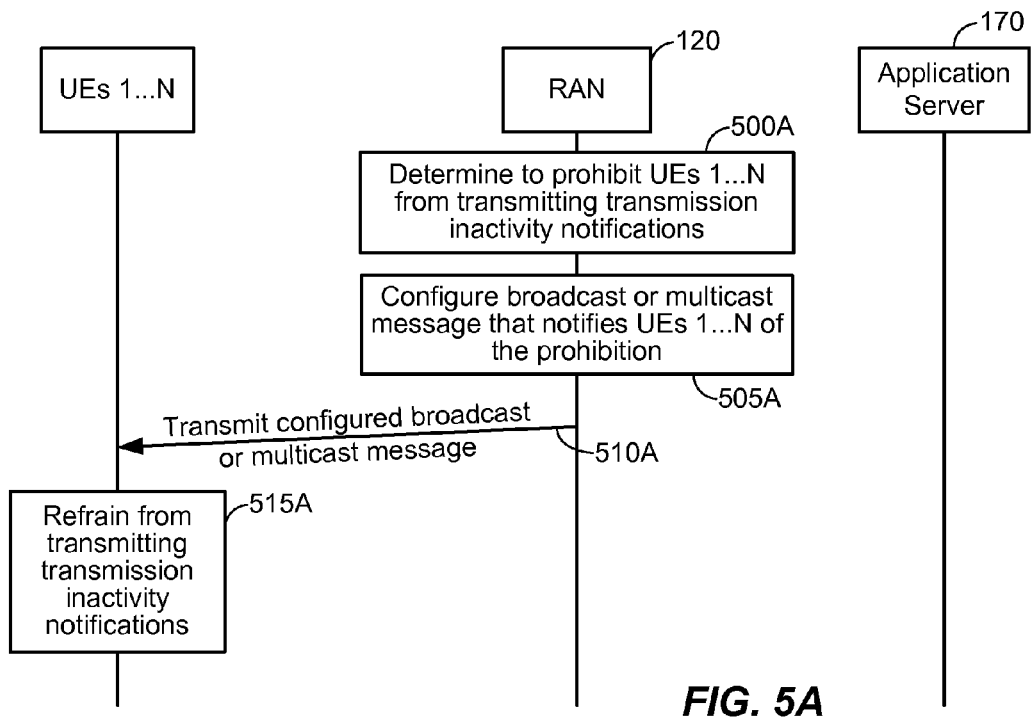
FIG. 5A is directed to a process by which an access network can prohibit a plurality of UEs from transmitting the transmission inactivity notifications in accordance with an embodiment of the invention.
Figure 5B:
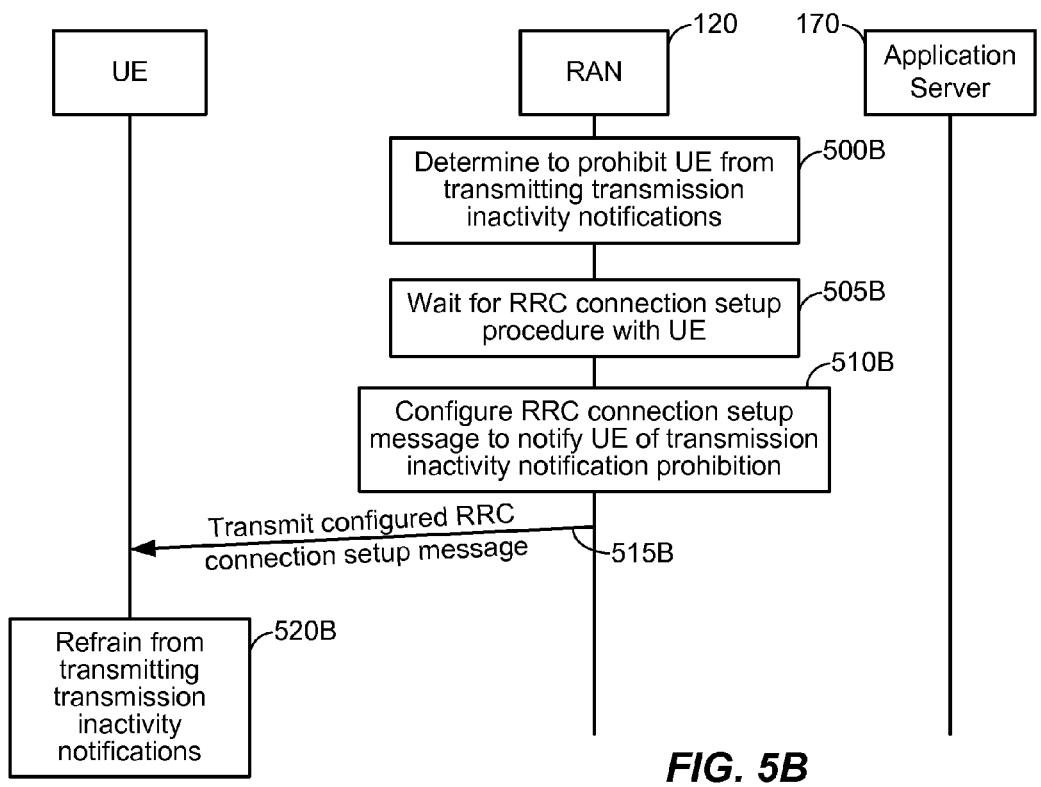
FIG. 5B is directed to a process by which the access network can prohibit a given UE from transmitting the transmission inactivity notifications in accordance with embodiments of the invention.
Figure 5C:
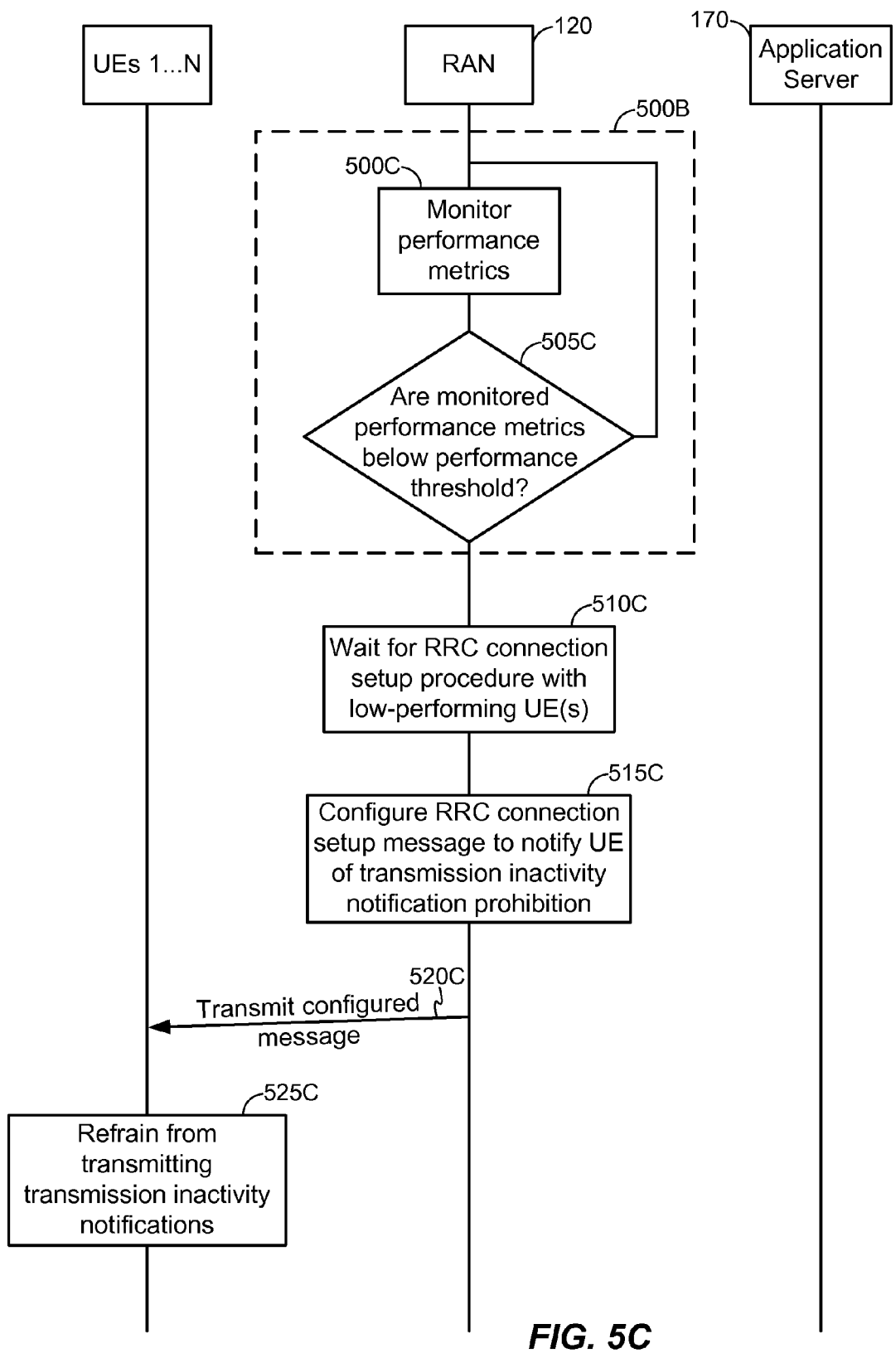
FIG. 5C illustrates an example implementation of the process of FIG. 5B applied to a plurality of UEs in accordance with an embodiment of the invention.

The embodiments discussed above with respect to FIGS. 4A though 4E relate to establishing triggering criteria by which the given UE transmits transmission inactivity notifications to the serving RNC at the RAN 120 in order to affect the manner in which the serving RNC controls the RRC-state of the given UE. However, it will be appreciated that the transmission inactivity notifications are signaling messages that consume system resources and can increase interference and overhead in the communications system. Thus, battery life of the given UE is not the only consideration related to whether to transmit the transmission inactivity notifications. FIGS. 5A through 5C are each directed to processes by which the RAN 120 can prohibit one or more UEs from transmitting the transmission inactivity notifications in accordance with embodiments of the invention.

FIG. 5A is directed to a process by which the RAN 120 can prohibit a plurality of UEs 1 . . . N from transmitting the transmission inactivity notifications in accordance with an embodiment of the invention. In FIG. 5A, in an embodiment, the plurality of UEs 1 . . . N can correspond to each UE that can be reached by the serving RNC within its serving area or subnet. In this case, as will be explained below, the notification of the prohibition can be 'broadcasted', or made global, to UEs in the serving area. In another embodiment, the plurality of UEs 1 . . . N can correspond to one or more specific groups of UEs, but not necessarily each UE in the serving area. In this case, as will be explained below, the notification of the prohibition can be 'multicasted' to UEs in the serving area.

Referring to FIG. 5A, assume that the serving RNC at the RAN 120 determines to prohibit UEs 1 . . . N from transmitting transmission inactivity notifications in 500A. For example, the determination of 500A can be based on high-load or other inefficiencies at one or more Node Bs in the subnet, such that prohibiting transmission inactivity notifications is expected to reduce the traffic load. At this point, the serving RNC configures a broadcast or multicast message that is configured to notify UEs 1 . . . N of the transmission inactivity notification prohibition. As noted above, if UEs 1 . . . N correspond to one or more specific groups of UEs, the configured message of 505A can correspond to a multicast message. Alternatively, if UEs 1 . . . N correspond to any UE served in the RNC's serving area, the configured message of 505A can correspond to a broadcast message. In a further example, the configured message of 505A can correspond to a pre-existing message already scheduled for transmission that is simply modified with a flag to indicate the prohibition to UEs 1 . . . N. In an alternative example, the configured message of 505A can be a proprietary message sent to UEs 1 . . . N.

The RAN 120 transmits the configured broadcast or multicast message to UEs 1 . . . N in 510A. UEs 1 . . . N receive the configured broadcast or multicast message, and thereafter refrain from transmitting transmission inactivity notifications, 515A. In other words, so long as UEs 1 . . . N are not permitted to transmit transmission inactivity notifications, UEs 1 . . . N refrain from executing the processes of FIGS. 4A through 4E. While not shown explicitly in FIG. 5A, if the serving RNC later determines to remove the prohibition, the RAN 120 may send another message that notifies UEs 1 . . . N of the prohibition removal and permits UEs 1 . . . N to again execute processes of FIGS. 4A through 4E.

FIG. 5B is directed to a process by which the RAN 120 can prohibit a given UE from transmitting the transmission inactivity notifications in accordance with embodiments of the invention. Unlike FIG. 5A, the process of FIG. 5B is directed to a selective prohibition that is applied to one particular UE at a time. Referring to FIG. 5B, assume that the serving RNC at the RAN 120 determines to prohibit the given UE from transmitting transmission inactivity notifications in 500B. For example, the determination of 500B can be in response to the serving RNC receiving an excessive number of transmission inactivity notifications from the given UE.

Next, instead of establishing a connection with the given UE to notify the given UE of the prohibition, the RAN 120 waits for a RRC connection set-up procedure to be initiated, 505B. In other words, the prohibition notification will be piggy-backed or tied to a RRC connection set-up procedure to conserve system resources. At some later point in time, assume that the serving RNC and the given UE engage in a RRC connection set-up procedure, and the serving RNC configures a RRC connection set-up or configuration message to notify the given UE of the transmission inactivity notification prohibition, 510B. In an example, the configured message of 510B can correspond to a pre-existing message already scheduled for transmission to the given UE, in conjunction with the RRC connection set-up procedure, that is modified with a flag to indicate the prohibition to the given UE.

The RAN 120 transmits the configured RRC connection set-up message to the given UE in 515B. The given UE receives the configured RRC connection set-up message, and thereafter refrains from transmitting transmission inactivity notifications, 520B. In other words, so long as the given UE is not permitted to transmit transmission inactivity notifications, the given UE refrains from executing the processes of FIGS. 4A through 4E. While not shown explicitly in FIG. 5B, if the serving RNC later determines to remove the prohibition, the RAN 120 may send another message that notifies the given UE of the prohibition removal and permits the given UE to again execute processes of FIGS. 4A through 4E.

FIG. 5C illustrates an example implementation of the process of FIG. 5B applied to a plurality of UEs 1 . . . N in accordance with an embodiment of the invention. Further, FIG. 5C illustrates an example whereby the prohibition determination by the serving RNC is based on monitored performance associated with UEs 1 . . . N.

Referring to FIG. 5C, the serving RNC at the RAN 120 monitors performance metrics associated with each of UEs 1 . . . N, 500C. For example, the performance metrics of UEs 1 . . . N that are monitored by the RAN 120 in 500C can include whether certain UEs among UEs 1 . . . N are requesting a user plane re-establishment within a threshold period of time following a transmission inactivity notification and/or whether the processor of the serving RNC of UEs 1 . . . N is overloaded. In 505C, the serving RNC at the RAN 120 determines whether the monitored performance metrics are below a given performance threshold. For example, the monitored performance metrics can be considered to be below the given performance threshold for UEs that request a user plane re-establishment within the threshold period of time following a transmission inactivity notification (i.e., the time interval between user plane re-establishment request and a preceding transmission inactivity notification for one or more UEs is below a time threshold). In another example, the monitored performance metrics can be considered to be below the given performance threshold if the processor at the serving RNC is overloaded (i.e., RNC processor load is higher than a load threshold), such that UEs are prohibited from sending subsequent transmission inactivity notifications so as to reduce the load on the processor of the serving RNC. If the RAN 120 determines that the monitored performance metrics are not below the given performance threshold N, the process returns to 500C and the RAN 120 continues to monitor the performance metrics. Otherwise, if the RAN 120 determines that the monitored performance metrics are below the given performance threshold, the process advances to 510C. As will be appreciated, 500C and 505C collectively correspond to an example implementation of 500B of FIG. 5B. Also, while not illustrated explicitly in FIG. 5C, if a relatively high proportion of UEs 1 . . . N are determined to be prohibited from transmitting transmission inactivity notifications, the process of FIG. 5A may be invoked (instead of FIG. 5B) so that a higher number of UEs can be notified of the prohibition in a more efficient manner.

Referring to FIG. 5C, the RAN 120 waits for a RRC connection set-up procedure to be initiated for each of UEs 1 . . . N for which the RAN 120 determines to prohibit from transmitting transmission inactivity notifications in 505C, 510C. In other words, the prohibition notification will be piggybacked or tied to a RRC connection set-up procedure to conserve system resources for the respective prohibited UE(s). At some later point in time, assume that the serving RNC and at least one of the prohibited UE(s) engage in a RRC connection set-up procedure, and the serving RNC configures a RRC connection set-up message to notify the prohibited UE(s) of the transmission inactivity notification prohibition, 515C. In an example, the configured message of 515C can correspond to a pre-existing message already scheduled for transmission that is modified with a flag to indicate the prohibition to the respective prohibited UE(s).

The RAN 120 transmits the configured RRC connection set-up message to the at least one prohibited UE in 520C. The at least one prohibited UE receives the configured RRC connection set-up message, and thereafter refrains from transmitting transmission inactivity notifications, 525C. In other words, so long as the at least one prohibited UE is not permitted to transmit transmission inactivity notifications, the at least one prohibited UE refrains from executing the processes of FIGS. 4A through 4E. While not shown explicitly in FIG. 5C, if the serving RNC later determines to remove the prohibition, the RAN 120 may send another message that notifies the at least one prohibited UE of the prohibition removal and permits the previously prohibited UE to again execute processes of FIGS. 4A through 4E. As will be appreciated, blocks 510C through 525C can be performed separately for each prohibited UE, as inferred from the decision block of 505C.

While references in the above-described embodiments of the invention have generally used the terms 'call' and 'session' interchangeably, it will be appreciated that any call and/or session is intended to be interpreted as inclusive of actual calls between different parties, or alternatively to data transport sessions that technically may not be considered as 'calls'. Also, while above-embodiments have generally described with respect to PTT sessions, other embodiments can be directed to any type of communication session, such as a push-to-transfer (PTX) session, an emergency VoIP call, etc.

Further, while embodiments of the invention have been described above as directed to wireless communication protocols such as W-CDMA, EV-DO, etc., it will be appreciated that the above-described embodiments can also be directed to a Long Term Evolution (LTE) wireless communication protocol.

In this case, it will be appreciated that the above-described embodiments can be modified somewhat so as to accommodate the LTE protocol. For example, LTE does not support certain RRC-layer messages, such as the above-described Signaling Connection Release Indication message. Accordingly, different RRC-layer messages can be used for supporting the transmission inactivity notifications in an LTE implementation. For example, a RRC connection Release Request message can be configured to convey the transmission inactivity notification in an LTE-implementation, instead of the above-described Signaling Connection Release Indication message.

Further, instead of the numerous RRC-connected states described above with respect to W-CDMA, LTE includes three states: (i) an Idle state, (ii) a connected-state with a short DRX (or paging) cycle and (iii) a connected-state with a long DRX (or paging) cycle. In this case, the Idle state consumes less power than the connected-state with short DRX, and the connected-state with short DRX consumes less power than the connected-state with long DRX. Thus, it will be appreciated how the above-embodiments can be modified to conform with the states defined for LTE. For example, the processes of FIGS. 4A and/or 4E whereby transitions occur between a high-powered state (e.g., CELL_FACH or CELL_DCH) and a lower-powered state (e.g., CELL_FACH, CELL_PCH, URA_PCH or Idle) can be carried over in a LTE implementation whereby transitions are made between the Idle state, the connected-state with short DRX cycle and the connected-state with long DRX.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a user terminal (UE) in a wireless communications system, comprising:
    determining that a client application executing on the UE has entered a period of transmission inactivity whereby the UE will not be required to transmit data on behalf of the client application;
    determining whether to transmit a transmission inactivity notification to a serving access network of the UE, the transmission inactivity notification configured to indicate the transmission inactivity period to the serving access network, wherein determining whether to transmit includes estimating a duration of the transmission inactivity period and comparing the estimated transmission inactivity period with a transmission inactivity period threshold; and
    selectively transmitting the transmission inactivity notification to the serving access network.

2. The method of claim 1,
    wherein the selectively transmitting step is based on the comparison between the estimated transmission inactivity period and the transmission inactivity period threshold.

3. The method of claim 2,
    wherein the selectively transmitting step transmits the transmission inactivity notification to the serving access network if the comparing step indicates the estimated transmission inactivity period is greater than the transmission inactivity period threshold, and
    wherein the selectively transmitting step does not transmit the transmission inactivity notification to the serving access network if the comparing step indicates the estimated transmission inactivity period is greater than the transmission inactivity period threshold.

4. The method of claim 2, wherein the transmission inactivity period threshold is received from the serving access network.

5. The method of claim 1,
    wherein he transmission inactivity notification is configured to include an indication of the estimate.

6. The method of claim 5, wherein the estimating step is based on a given periodic interval at which the client application is transmitting periodic data to the serving access network.

7. The method of claim 1,
    wherein the client application is transmitting periodic data at a given periodic interval,
    wherein the determination that the client application has entered the transmission inactivity period is further based on a response to a transmission of the periodic data.

8. The method of claim 1, further comprising:
    determining information associated with one or more other client applications executing on the UE,
    wherein the determination as to whether to transmit the transmission inactivity notification is based in part on the determined information.

9. The method of claim 8,
    wherein the determining information step determines whether a transmission buffer of the UE is empty,
    wherein the determination as to whether to transmit the transmission inactivity notification determines to transmit the transmission inactivity notification if the transmission buffer of the UE is determined to be empty, and
    wherein the determination as to whether to transmit the transmission inactivity notification determines not to transmit the transmission inactivity notification if the transmission buffer of the UE is not determined to be empty.

10. A method of operating a user terminal (UE) in a wireless communications system, comprising:
    determining that a client application executing on the UE has entered a period of transmission inactivity whereby the UE will not be required to transmit data on behalf of the client application;
    determining whether to transmit a transmission inactivity notification to a serving access network of the UE, the transmission inactivity notification configured to indicate the transmission inactivity period to the serving access network;

selectively transmitting the transmission inactivity notification to the serving access network;
determining that a duration of the transmission inactivity period cannot be estimated; and
determining whether a time at which a previous transmission inactivity notification was sent by the UE on behalf of the client application is less than an inactivity reporting interval threshold,
wherein the selectively transmitting, step is based on the comparison.

11. The method of claim 10,
wherein the selectively transmitting step transmits the transmission inactivity notification to the serving access network if the comparing step indicates that the time at which the previous transmission inactivity notification was sent is not less than an inactivity reporting interval threshold, and
wherein the selectively transmitting step does not transmit the transmission inactivity notification to the serving access network if the comparing step indicates that the time at which the previous transmission inactivity notification was sent is less than an inactivity reporting interval threshold.

12. The method of claim 1, further comprising:
receiving a message from the serving access network that prohibits the UE front transmitting transmission inactivity notifications on behalf of the client application; and
refraining from transmitting transmission inactivity notifications based on the received message.

13. The method of claim 12, wherein the received message corresponds to a multicast or broadcast message that is sent to a plurality of UEs.

14. The method of claim 12, wherein the received message corresponds to a unicast message.

15. The method of claim 13, wherein the received message is received during a radio resource control (RRC) connection set-up procedure.

16. The method of claim 12, wherein the received message is triggered in response to (i) a request by the UE for a user plane re-establishment within a threshold period of time following the transmission of the transmission inactivity notification and/or (ii) processing overload at the serving access network.

17. The method of claim 1, wherein the transmission inactivity notification is included within a Signaling Connection Release Indication message or a Connection Release Request message.

18. A method of operating an access network in a wireless communications system, comprising:
receiving, from a user equipment (UE) within a serving area of the access network, a transmission inactivity notification, the transmission inactivity notification configured to indicate a period of transmission inactivity associated with a client application executing on the UE, wherein the received transmission inactivity notification includes an indication of an estimated duration of the transmission inactivity period;
determining to transition the UE from a first state to a second state based at least in part on the received transmission inactivity notification, the second state associated with lower-power consumption of the UE than the first state; and
sending instructions to the UE to facilitate the transition of the UE from the first state to the second state.

19. The method of claim 18, further comprising;
comparing the estimated transmission inactivity period with at least one transmission inactivity period threshold,
wherein the determining step is based on the comparison.

20. The method of claim 19,
wherein the determining step determines to transition the UE from the first state to the second state if the comparing step indicates the estimated transmission inactivity period is greater than the at least one transmission inactivity period threshold, and
wherein the determining step determines not to transition the UE from the first state to the second state if the comparing step indicates the estimated transmission inactivity period is not greater than the at least one transmission inactivity period threshold.

21. The method of claim 18, further comprising:
determining a transmission inactivity period threshold to he used by the UE in order to determine whether the UE is to transmit a given transmission inactivity notification; and
notifying the UE of the given transmission inactivity period threshold.

22. The method of claim 21, wherein the transmission inactivity period threshold designates a minimum duration of transmission inactivity to trigger transmission of the given transmission inactivity notification.

23. The method of claim 18, further comprising:
determining a transmission inactivity reporting threshold to be used by the UE in order to determine whether the UE is to transmit a given transmission inactivity notification in the event that the UE cannot determine an estimated duration for a given transmission inactivity period; and
notifying the UE of the given transmission inactivity reporting threshold.

24. The method of claim 23, wherein the transmission inactivity reporting threshold designates a minimum time interval between consecutive transmissions of the given transmission inactivity notification from the UE.

25. The method of claim 18, wherein the sending step sends the instructions to the UE via a multicast or broadcast message.

26. The method of claim 18, wherein the sending step sends the instructions to the UE via a unicast message.

27. The method of claim 26, wherein the sending step sends the instructions to the UE during a radio resource control (RRC) connection set-up procedure.

28. The method of claim 18, wherein the received transmission inactivity notification is included within a Signaling. Connection Release Indication message or a Connection Release Request message.

29. The method of claim 18,
wherein the first state corresponds to CELL_FACH state, and
wherein the second state corresponds to CELL_PCH state, URA_PCH state or Idle state.

30. The method of claim 18,
wherein the first state corresponds to CELL_DCH state, and
wherein the second state corresponds to CELL_DCH state, CELL_PCH state, URA_PCH state or Idle state.

31. The method of claim 18,
wherein the first state corresponds to a first connected state with a first paging cycle, and wherein the second state corresponds to a second connected state with a second paging cycle that is longer than the first paging cycle or an Idle state.

32. The method of claim 18,
wherein the first state corresponds to a connected state with a paging cycle, and
wherein the second state corresponds to an Idle state.

33. A method of operating an access network in a wireless communications system, comprising:
determining to prohibit one or more user equipments (UEs) within a serving area of the access network from transmitting transmission inactivity notifications that are configured to indicate periods of transmission inactivity associated with client applications executing on the one or more UEs;
configuring instructions to notify the one or more UEs with regard to the prohibition transmit the transmission inactivity notifications; and
sending the configured instructions to the one or more UEs.

34. The method of claim 33, wherein the sending step sends the instructions to the one or more UEs via a multicast or broadcast message.

35. The method of claim 33, wherein the sending step sends the instructions to the one or more UEs via one or more unicast messages.

36. The method of claim 35, wherein the sending step sends the instructions to the UE during a radio resource control (RRC) connection set-up procedure.

37. The method of claim 33, wherein the determining step includes:
monitoring one or more performance metrics;
comparing the one or more monitored performance metrics with one or more performance thresholds, and
wherein the determining step is based on the comparison.

38. The method of claim 37,
wherein the monitored performance metrics include time intervals between when the access network receives transmission inactivity notifications from the one or more UEs and
when the one or more UEs subsequently request re-establishment of a user plane,
wherein the comparing step compares the time intervals with a threshold period of time, and
wherein the determining step determines to prohibit any UEs among the one or more UEs that request re-establishment of the user plane within the threshold period of time.

39. The method of claim 37,
wherein the monitored performance metrics include processing load at the access network,
wherein the comparing step compares the processing load at the access network with a load threshold, and
wherein the determining step determines to prohibit the one or more UEs if the comparing step indicates that the processing load at the access network is above the load threshold.

40. A user equipment (UE) in a wireless communications system, comprising:
means for determining that a client application executing on the UE has entered a period of transmission inactivity whereby the UE will not be required to transmit data on behalf of the client application;
means for determining whether to transmit a transmission inactivity notification to a serving access network of the UE, the transmission inactivity notification configured to indicate the transmission inactivity period to the serving access network, wherein the means for determining whether to transmit include means for estimating a duration of the transmission inactivity period and means for comparing the estimated transmission inactivity period with a transmission inactivity period threshold; and
means for selectively transmitting the transmission inactivity notification to the serving access network.

41. An access network in a wireless communications system, comprising:
means for receiving, from a user equipment (UE) within a serving area of the access network, a transmission inactivity notification, the transmission inactivity notification configured to indicate a period of transmission inactivity associated with a client application executing on the UE, wherein the received transmission inactivity notification includes an indication of an estimated duration of the transmission inactivity period;
means for determining to transition the UE from a first state to a second state based at least in part on the received transmission inactivity notification, the second state associated with lower-power consumption of the UE than the first state; and
means for sending instructions to the UE to facilitate the transition of the UE from the first state to the second state.

42. An access network in a wireless communications system, comprising:
means for determining to prohibit one or more user equipments (UEs) within a serving area of the access network from transmitting transmission inactivity notifications that are configured to indicate periods of transmission inactivity associated with client applications executing on the one or more UEs; and
means for configuring instructions to notify the one or more UEs with regard to the prohibition to transmit the transmission inactivity notifications; and
means for sending the configured instructions to the one or more UEs.

43. A user equipment (UE) in a wireless communications system, comprising:
logic configured to determine that a client application executing on the UE has entered a period of transmission inactivity whereby the UE will not be required to transmit data on behalf of the client application;
logic configured to determine whether to transmit a transmission inactivity notification to a serving access network of the UE, the transmission inactivity notification configured to indicate the transmission inactivity period to the serving access network, wherein the logic configured to determine whether to transmit a transmission inactivity notification to a serving access network of the UE includes logic configured to estimate a duration of the transmission inactivity period and logic configured to compare the estimated transmission inactivity period with a transmission inactivity period threshold; and
logic configured to selectively transmit the transmission inactivity notification to the serving access network.

44. An access network in a wireless communications system, comprising.:
logic configured to receive, from a user equipment (UE) within a serving area of the access network, a transmission inactivity notification, the transmission inactivity notification configured to indicate a period of transmission inactivity associated with a client application executing on the UE, wherein the received transmission inactivity notification includes an indication of an estimated duration of the transmission inactivity period;

logic configured to determine to transition the UE from a first state to a second state based at least in part on the received transmission inactivity notification, the second state associated with lower-power consumption of the UE than the first state; and logic configured to send instructions to the UE to facilitate the transition of the UE from the first state to the second state.

45. An access network in a wireless communications system, comprising:

logic configured to determine to prohibit one or more user equipments (UEs) within a serving area of the access network from transmitting transmission inactivity notifications that are configured to indicate periods of transmission inactivity associated with client applications executing on the one or more UEs; and logic configured to configure instructions to notify the one or more UEs with regard to the prohibition to transmit the transmission inactivity notifications; and logic configured to send the configured instructions to the one or more UEs.

46. A non-transitory computer-readable storage medium containing instructions stored thereon, which, when executed by a user equipment (UE) in a wireless communications system, cause the to perform operations, the instructions comprising:

program code to determine that a client application executing on the UE has entered a period of transmission inactivity whereby the UE will not be required to transmit data on behalf of the client application, wherein the program code to determine that a client application executing on the UE has entered a period of transmission inactivity includes program code to estimate a duration of the transmission inactivity period and program code to compare the estimated transmission inactivity period with a transmission inactivity period threshold;

program code to determine whether to transmit a transmission inactivity notification to a serving access network of the UE, the transmission inactivity notification configured to indicate the transmission inactivity period to the serving access network; and program code to selectively transmit the transmission inactivity notification to the serving access network.

47. A non-transitory computer-readable storage medium containing instructions stored thereon, which, when executed by an access network in a wireless communications system, cause the access network UE to perform operations, the instructions comprising:

program code to receive, from a user equipment (UE) within a serving area of the access network, a transmission inactivity notification, the transmission inactivity notification configured to indicate a period of transmission inactivity associated with a client application executing on the UE, wherein the received transmission inactivity notification includes an indication of an estimated duration of the transmission inactivity period;

program code to determine to transition the UE from a first state to a second state based at least in part on the received transmission inactivity notification, the second state associated with lower-power consumption of the UE than the first state; and program code to send instructions to the UE to facilitate the transition of the UE from the first state to the second state.

48. A non-transitory computer-readable storage medium containing instructions stored thereon, which, when executed by an access network in a wireless communications system, cause the access network UE to perform operations, the instructions comprising:

program code to determine to prohibit one or more user equipments (UEs) within a serving area of the access network from transmitting transmission inactivity notifications that are configured to indicate periods of transmission inactivity associated with client applications executing on the one or more UEs; and program code to configure instructions to notify the one or more UEs with regard to the prohibition to transmit the transmission inactivity notifications; and program code to send the configured instructions to the one or more UEs.

* * * * *